W. R. NEUDECK.
DECOY MINNOW.
APPLICATION FILED JUNE 12, 1920.
1,401,096.
Patented Dec. 20, 1921.
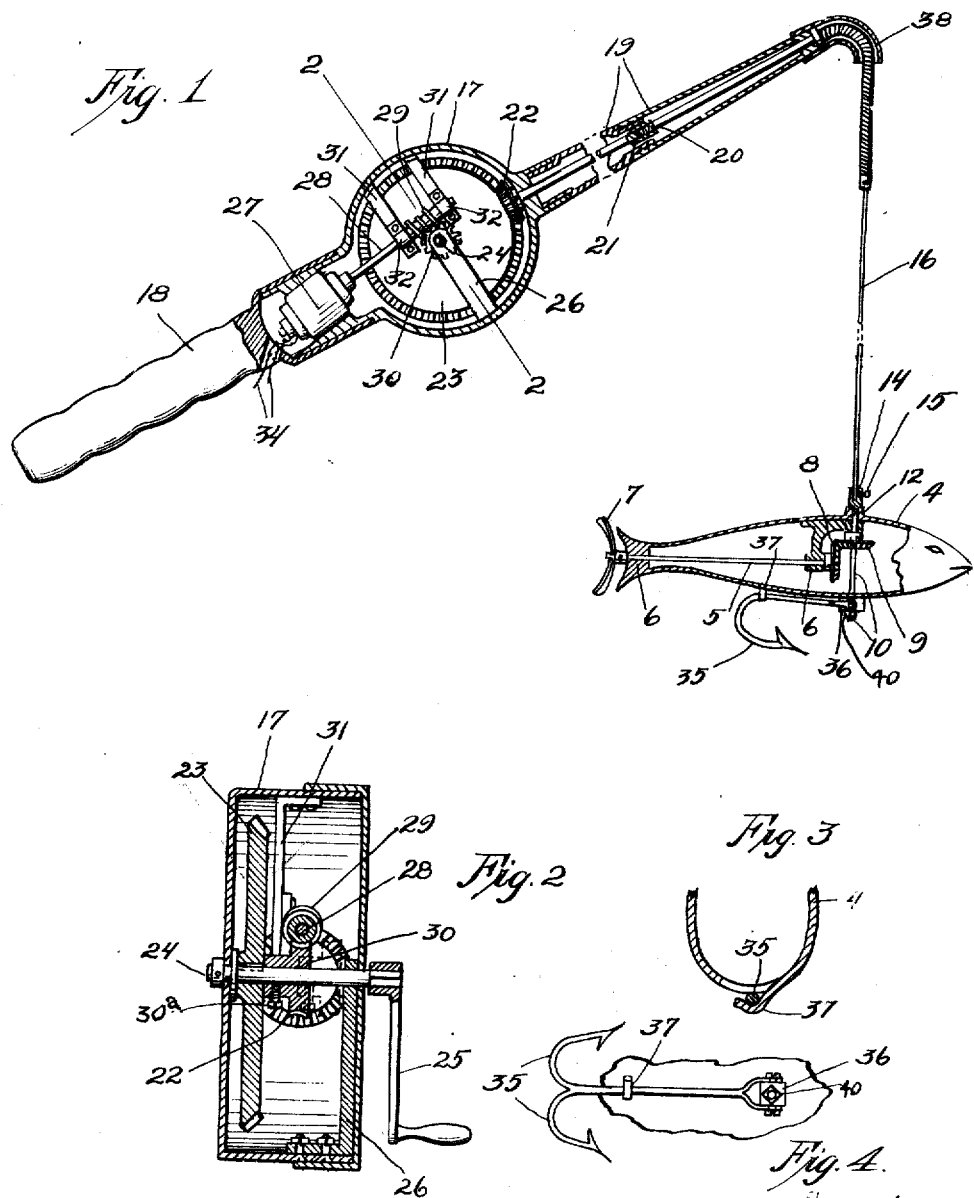

UNITED STATES PATENT OFFICE.

WESELY R. NEUDECK, OF KANSAS CITY, KANSAS.

DECOY-MINNOW.

1,401,096.　　　Specification of Letters Patent.　　Patented Dec. 20, 1921.

Application filed June 12, 1920. Serial No. 388,602.

*To all whom it may concern:*

Be it known that I, WESELY R. NEUDECK, a citizen of the United States, and resident of Kansas City, in the county of Wyandotte and State of Kansas, have invented a certain new and useful Improvement in Decoy-Minnows, of which the following is a complete specification.

The present invention relates to angling devices, and aims to provide an improved form of decoy minnow construction having a propeller member which is adapted to be actuated in a convenient manner by the angler imparting movements to the minnow when the latter is in the water, and thereby simulate more or less the movements of a genuine minnow.

Accordingly I have devised an improved tackle construction of this character in which use is made of an artificial minnow which is provided with a propeller member, and with a tackle line which is connected with the artificial minnow and provided with propeller-actuating means operating through the said tackle line for imparting the necessary rotary movement to the propeller member.

In carrying out the invention in practice, I provide the artificial minnow with a propeller which is geared to the tackle line, the latter being constituted as a flexible shaft having suitable gearing within the handle portion of the tackle and arranged to be conveniently operated by means of either a motor mounted within said handle portion or by manual means also associated with said gearing. With the foregoing objects in view, I will now describe the invention by means of reference to the accompanying drawings illustrating one form of construction which I have devised for embodying the proposed improvements, after which the novel features therein will be particularly set forth and claimed.

In the drawing:

Figure 1 is a sectional elevation illustrating a fishing tackle having embodied therein a decoy minnow construction in accordance with the present invention;

Fig. 2 is an enlarged transverse section taken on the line 2—2 of Fig. 1;

Fig. 3 is a sectional detail illustrating the form of attachment between the fish hook and decoy figure of the construction; and Fig. 4 is a fragmentary detail view showing the fish hook mounting.

Referring now to the said drawing in detail, this illustrates the improved tackle construction as comprising a decoy or artificial minnow 4, within which I mount a propeller shaft 5 having suitable bearings 6 for journaling said shaft, to the rear or tail end of which I attach a propeller member 7. To the forward or opposite end of said shaft 5 is secured a beveled gear 8 meshing with a similar beveled gear 9, which is secured to a short shaft 10 journaled in a suitable bearing 12 and in the breast of the minnow 4, as clearly illustrated in Fig. 1.

The exterior portion of the shaft 10 is formed with a terminal socket 14 and clamping screw 15 for the purpose of providing a detachable connection between said shaft and the end of the tackle line 16 which in the present case is of such a construction as to form a flexible shaft connection between the gearing within the minnow 4 and suitable actuating means inclosed within the housing structure 17 associated with the handle portion 18 of the tackle rod 19, which as usual is formed in sections as shown in Fig. 1. To correspond with the sectional rod structure, the line or shaft 16 is also formed in sections within the rod 19, said sections being easily connected by means of nipple portions 20 and threaded sockets 21.

That end of the line or shaft 16 which is near the handle 18 is fitted with a beveled gear 22 meshing with a bevel gear wheel 23 within the housing structure 17, said gear wheel 23 being mounted upon a transverse shaft 24 which is provided with an exterior operating handle or crank 25, as shown in Fig. 2. A stiffening bracket element 26 is provided within the housing structure 17 for reinforcing the said housing structure and also providing a bearing for one end of the shaft 24. It is apparent that by simply rotating the crank member 25, and thereby turning the gear wheel 23, the line or shaft 16 will be rotated and caused to impart corresponding rotation to the propeller member 7 through the intermediate gearing 8 and 9. In case it should be desired to dispense with an operating handle, such as indicated at 25, and actuate the decoy structure through the medium of a motor, I have arranged to do this by mounting a suitable electric motor 27 within the handle portion 18 adjacent to the housing 17, the shaft of this motor being provided with a worm 29 which in turn meshes with a worm gear 30 secured upon the middle portion of the transverse shaft 24 by means of a set screw 30ª. It will be apparent in this connection that the set screw must be loosened to permit the gear 30 to rotate freely when the shaft 24 is rotated by means of the handle 25, as otherwise such rotation would be opposed by the worm 29, as will be readily understood. A pair of hanger members 31 are secured to the interior of the housing structure in position for providing bearings 32 for the motor shaft 28 at opposite sides of the worm 30. The motor 27 need be only of a very small size sufficient for merely providing such power as would be required for operation of the shaft 16, and accordingly the electric connections 33 to the motor 27 may simply be attached to a small battery (not shown) of sufficient strength for the purpose desired.

It is preferred to attach a fish hook 35 of the multiple prong type, by means of a block 36 swivelly connected with said hook and rotatably attached to the lower end of the shaft 10 and retained thereon by means of a suitable nut 40, the shank of said hook being supported by a yielding catch 37 projecting outwardly from the body 4 of the minnow. An elbow 38 is provided at the free end of the rod 19, to accommodate the angular portion of the line 16 at this point.

It will thus be apparent that I have devised a simple, convenient, compact and efficient construction for carrying out the desired objects of the invention. By manual operation of the handle 25, or by operation of the motor 27, the drive through the shaft 16 may be maintained for actuating the propeller member 7 and the latter caused to execute the familiar movements of a minnow in the water where the device is being employed. As is well known a lifelike movement of the bait is more likely to have the result of attracting the attention of the fish than would a merely passive object in the water. Where the device is manually operated, by means of the handle 25, a very lifelike motion may be imparted to the minnow by varying spasmodically the movements of the minnow in a manner readily understood. Where this is not feasible, or it is desired to set the tackle or operate a number of the tackles at the same time, it will be convenient to make use of the feature of the motor 27, this automatically taking care of the actuation of the propeller member without any constant attention on the part of the angler.

While I have illustrated and described what I now regard as the preferred form of construction, I desire to reserve the right to make such changes or modifications as may fairly fall within the scope of the following claim.

What I claim is:

A fishing tackle comprising a rod, an artificial minnow provided with a propeller member, a flexible shaft forming the tackle line between said rod and minnow and rotatably connected with the latter, a fish hook provided with a swivel connection with the free end of said shaft, said connection permitting rotary movement of said shaft, the intermediate shank portion of said hook having a detachable connection with the minnow, and means operable through said shaft for actuating said propeller member.

In witness whereof I hereto affix my signature.

WESELY R. NEUDECK.